United States Patent
Burrows et al.

(10) Patent No.: US 6,397,117 B1
(45) Date of Patent: May 28, 2002

(54) DISTRIBUTED COMPUTER AIDED DESIGN SYSTEM AND METHOD

(75) Inventors: David F. Burrows, Godalming (GB); Kwok Wing Choy, San Francisco, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/085,717

(22) Filed: May 28, 1998

(30) Foreign Application Priority Data

Jun. 4, 1997 (GB) .............................................. 9711559

(51) Int. Cl.[7] .............................................. G06F 19/00
(52) U.S. Cl. ......................... 700/97; 700/121; 700/128; 716/21
(58) Field of Search ........................... 700/97, 121, 98, 700/182; 345/331, 964; 707/201, 203; 709/204; 716/21

(56) References Cited

U.S. PATENT DOCUMENTS

| | | | | |
|---|---|---|---|---|
| 5,295,081 A | | 3/1994 | Habra | 364/489 |
| 5,339,247 A | * | 8/1994 | Kirihara et al. | 364/468.13 |
| 5,493,679 A | * | 2/1996 | Virgil et al. | 707/104 |
| 5,777,877 A | * | 7/1998 | Beppu et al. | 364/468.03 |
| 5,815,683 A | * | 9/1998 | Vogler | 395/500 |
| 5,995,097 A | * | 11/1999 | Tokumine et al. | 345/331 |

FOREIGN PATENT DOCUMENTS

EP        0 558 006 A2    1/1993
EP        0750267         12/1996    ............ G06F/17/50

OTHER PUBLICATIONS

Dialog record 01249598 of UNIX Review, v6,n5, May 1988,p48(11), Kim et al, "Merged models".

* cited by examiner

Primary Examiner—Ayaz Sheikh
Assistant Examiner—Firmin Backer
(74) Attorney, Agent, or Firm—Christopher P. Maiorana, PC

(57) ABSTRACT

A distributed computer aided design (CAD) system includes a CAD server station and one or more CAD client stations remote from the server station but connectable thereto via a communications medium such as an intranet or the internet. The CAD server station includes a CAD tool for performing CAD tasks and a communications interface. The CAD client stations include display and data entry facilities for displaying a design parameter entry document to a user and for accepting design parameters entered by the user, as well as a communications interface for transmitting entered design parameters via the communications medium to the server station. The CAD tool at the server station is configured to receive the design parameters from the client station, to perform CAD tasks based on the design parameters and to return processed design data to the server station via the communications medium. The client station can include a workstation with a web browser capability. The server station can be configured to respond to a request from a client station to supply a design parameter input form. Integrated circuit design can be performed by providing circuit design executables and circuit design libraries (e.g for memory cells) at the CAD tool. The CAD tool can also provide simulation tools.

15 Claims, 6 Drawing Sheets

COMPILED MEMORY REQUEST FORM

COMPUTER SELECTION GUIDE

COMPILER SELECTION GUIDE CONTAINS BRIEF DESCRIPTIONS OF ALL COMPILERS AVAILABLE IN EACH SUPPORTED TECHNOLOGIES.

TECHNOLOGY [ka300k]

CELL NAME: [rr]

COMPILER NAME: [ ]

NUMBER OF WORDS: [ ]

NUMBER OF BITS: [ ]

COLUMN OPTION: [ ]

OPERATING FREQUENCY: [50]

BIST [YES]   VOLTAGE [5.0V]   WRITE OPTION [WORD]   BITS_PER_BYTE: [1]

MEMORY ENABLE: [TRUE]

FIG. 5

DISTRIBUTED COMPUTER AIDED DESIGN SYSTEM AND METHOD

BACKGROUND OF THE INVENTION

The invention relates to computer aided design systems and methods.

Traditionally, computer aided design tools and the associated design libraries reside on a user's computer system, either a workstation or personal computer, or a local (nearby) computer mainframe or fileserver at the user's location or within the user's local computer system. A sophisticated user-machine interface then permits the user to enter data into the CAD tool to enable that tool to process and display results, error messages, and so on to the user. If the user concerned is not the person responsible for maintaining the computer aided design tool (for example where the user concerned is not at the location where the CAD tool is created and maintained), it is necessary for the user to receive the CAD tool executables and libraries and to maintain his local copy. In a rapidly changing environment, frequent changes to the CAD tool may become necessary. FIG. 1 of the accompanying drawings is a schematic representation of this scenario where the CAD tools maintenance location 12 has to send copies of the relevant tools 14 (by physical or electronic means, as appropriate), to the relevant user CAD locations 16.

The disadvantages of this conventional approach of keeping local CAD tools can be summarised as follows:
1. CAD tool executables change frequently and the user must keep updating his local copy.
2. In turn, this means that the designers/maintainers of a CAD tool must send out multiple copies once a significant update has been made to the CAD tool concerned.
3. Libraries referred to by the executable are also changed frequency. Accordingly, the user must continue to update his local copies and the designers/maintainers of the CAD tool libraries must continue to send out multiple copies once significant updates have been made.
4. CAD designers/maintainers are reluctant to send out updates following minor tool or library updates due to the logistical overheads involved as indicated above. Accordingly, a user's local CAD tool and associated library can rapidly get out of date.
5. File storage must be available for the CAD tool executables and associated library at the user's location. Some CAD executables and libraries are used infrequently, but will nevertheless have to be backed up and maintained as any other piece of software at the user's location.
6. The local computer power made available to the user must exceed the maximum requirements for acceptable performance during the execution of the CAD tool, which can significantly increase the cost of a user's computing requirements.

Accordingly, it is an aim of the present invention to provide a solution which at least mitigates the various problems and disadvantages of the conventional CAD approach set out above.

SUMMARY OF THE INVENTION

In accordance with an aspect of the invention, there is provided a distributed computer aided design system comprising:
  a computer aided design server station including a computer aided design tool for performing computer aided design tasks and a communications interface; and
  one or more computer aided design client stations remote from the server station and connectable to the server station via a communications medium, a client station comprising display and data entry means for displaying a design parameter entry document to a user and for accepting design parameters entered by the user and a communications interface for transmitting the design parameters via the communications medium to the server station;
  the computer aided design tool at the server station being configured to receive the design parameters from the client station, to perform computer aided design tasks based on the design parameters and to return a design task product to the server station via the communications medium. The design task product can comprise, for example, a file comprising parameters specifying a resulting design, for example, of a circuit for an integrated circuit.

An embodiment of the invention can provide significant advantages over the conventional CAD approach described earlier:
1. No local copy of the CAD tool executable needs to be kept on the user's system. Accordingly, whenever the CAD tool executable is changed by the CAD designers/maintainers, only the master copy on the server station needs to be updated.
2. Updates are consequently only necessary at the server station and the need for distributing multiple copies is no longer required.
3. The same benefits as indicated at 1 and 2 also apply to CAD tool libraries.
4. CAD designers/maintainers will be encouraged to update the master copy much more regularly in view of the reduced logistics in this process.
5. The file storage for the CAD tool executables and libraries is only necessary at the server station, and only the master copy of this needs to be backed up. Users are therefore relieved of the requirement to maintain the CAD tool executables and libraries.
6. A consequence of the above is that only the server station needs to be provided with the computing power for providing acceptable performance during execution of the CAD tool. Preferably, this is able to handle multiple users, possibly in a batch, or alternatively in a coprocessing manner.

In a preferred embodiment of the invention, the communications medium is an intranet or internet medium. In such an embodiment a cost effective implementation of a client station is in the form of a computer workstation having web browser capability.

The client station can be arranged to generate its own parameter entry forms. However, it is advantageous for the server station to be configured to respond to a request communicated from a client station to supply a design parameter input form to the client station. This ensures that the parameter input form used; takes account of all input parameter requirements of the design tool concerned.

A preferred embodiment of the invention provides integrated circuit design functions. In this case, the computer aided design tool comprises circuit design executables and circuit design libraries, the circuit design executables being responsive to the design parameters to access the circuit design libraries automatically to perform the circuit design. A specific example of this which is particularly suitable for parameterised design specification provides memory design executables and memory design, libraries.

The computer aided design tool can also provide simulation tools.

The invention also provides a computer aided design server station for a distributed computer aided design system as set out above, the server station comprising a computer aided design tool for performing computer aided design task and a communications interface whereby the server station is connectable to at least one computer aided design client station remote from the server station via a communications medium, the computer aided design tool at the server station being configured to receive design parameters from a client station via the communications medium, to perform computer aided design tasks based on the design parameters and to return a design task product to the server station via the communications medium.

The invention further provides a method of conducting computer aided design at a client station for a distributed computer aided design system as set out above, the method comprising, at said client station, displaying a design parameter entry document to a user, accepting design parameters entered by the user, transmitting the design parameters via the communications medium to a remote computer aided design server station for performing computer aided design tasks on the design parameters, and receiving a design task product via the communications medium from the server station.

In accordance with another aspect of the invention, there is provided a method of performing computer aided design comprising steps of:
a) presenting a design parameter document to a user at a client computer aided design station;
b) following input of the computer aided design parameters, transmitting the computer aided design parameters via a communications medium to a remote computer aided design server station including a computer aided design tool for performing computer aided design tasks;
c) automatically performing computer aided design tasks in response to the design parameters; and
d) transmitting a design task product to the server station via the communications medium.

DESCRIPTION OF THE DRAWINGS

An exemplary embodiment of the invention is described hereinafter, by way of example only, with reference to the accompanying drawings in which like reference signs relate to like parts and in which:

FIG. 5 is a schematic representation of a parameter input form for use at the client station of FIG. 4.

DESCRIPTION OF A PREFERRED EMBODIMENT

Figure 1:
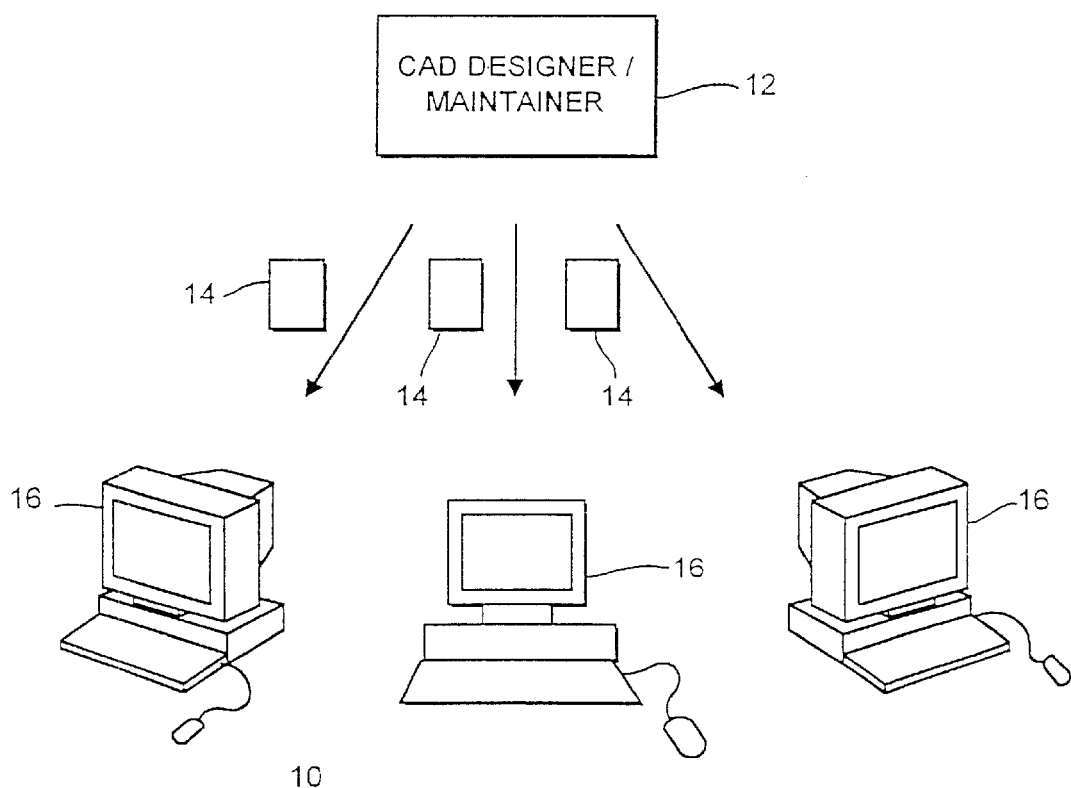
FIG. 1 is a schematic representation of a conventional distributed system for computer aided design.
Figure 2:
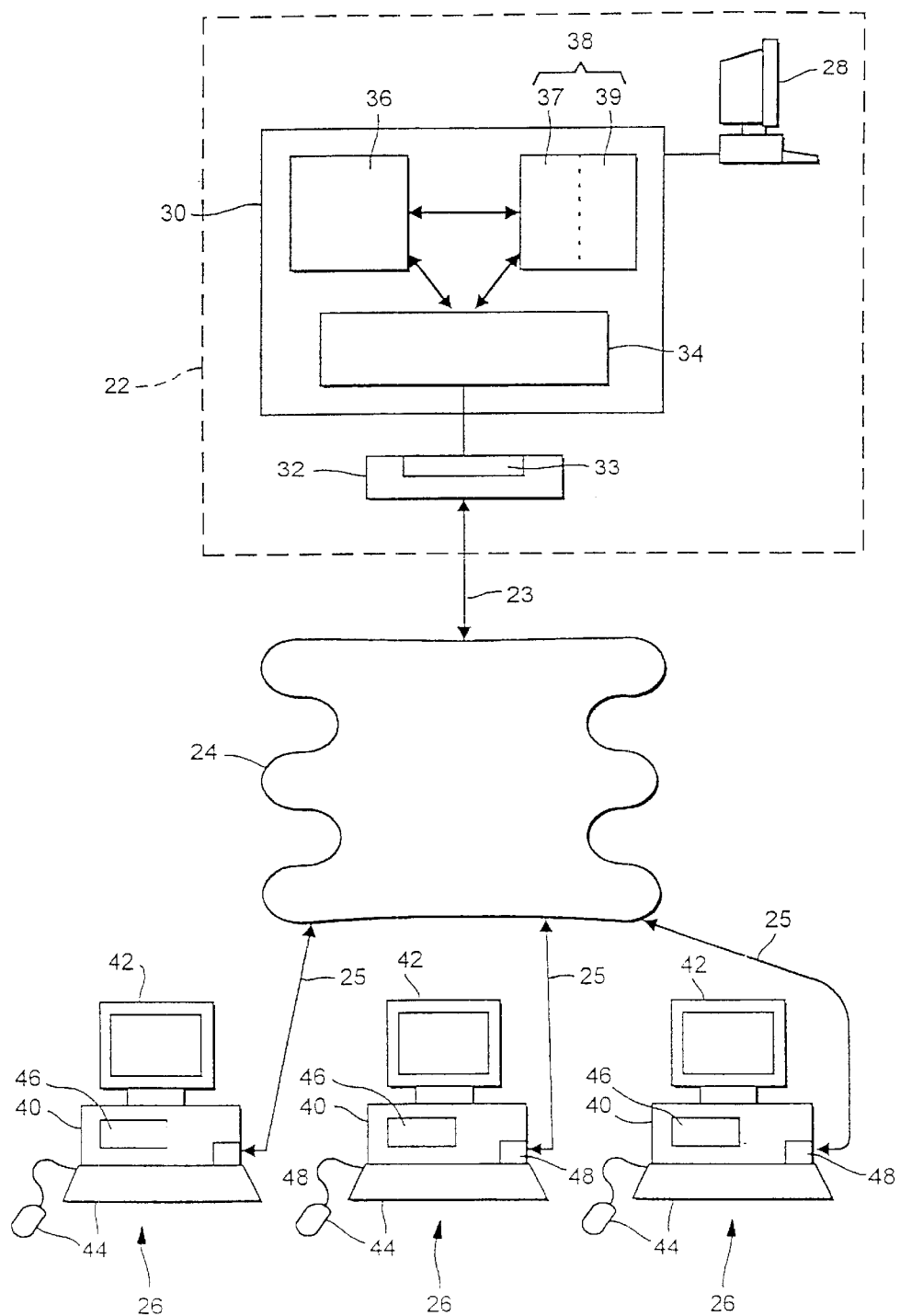
FIG. 2 is a schematic representation of an example of a distributed computer aided design system in accordance with the invention.

FIG. 2 is a schematic overview of an example of a computer aided design system in accordance with the present invention. As shown in FIG. 2, a server station 22 communicates with the plurality of client stations 26 via a communications medium 24, which is preferably an intranet or internet medium. Other network mediums could be used. However, in the present computing environment, the use of an intranet or internet provides an ideal vehicle for implementing an example of the present invention.

As illustrated schematically in FIG. 2, the server station comprises an intranet/internet interface 32 including a modem 33 for connection to the communications medium via a link 23. A computer 30, which includes a central processing unit, associated main and mass storage memory and all the other typical attributes of a computer, supports a number of applications including a network monitor application 34, management applications 36 and a computer aided design tool 38, including design tool executables 37 (programs) and design tool libraries 39. One or more user stations 28 including a display, (possibly a local processor) and input/ output devices can be provided for CAD tool designers/maintainers to create and maintain the CAD tool 38.

At a client station 26, a user is provided with a computer workstation 40 having a display 42, user input devices 44, a processor 46 with associated memory, etc, and a network interface 48 including a modem. The user's workstation 40 is also provided, in the preferred embodiment of the invention, with network browser software which is stored in the workstation's memory and executed on the workstation's processors.

It will be noted that any number of client stations can be connected to the server station via the network 24, although the number of client stations which can make access at any one time to the server station will be limited by the bandwidth of the server station 22, and possibly the network 24.

Figure 3:
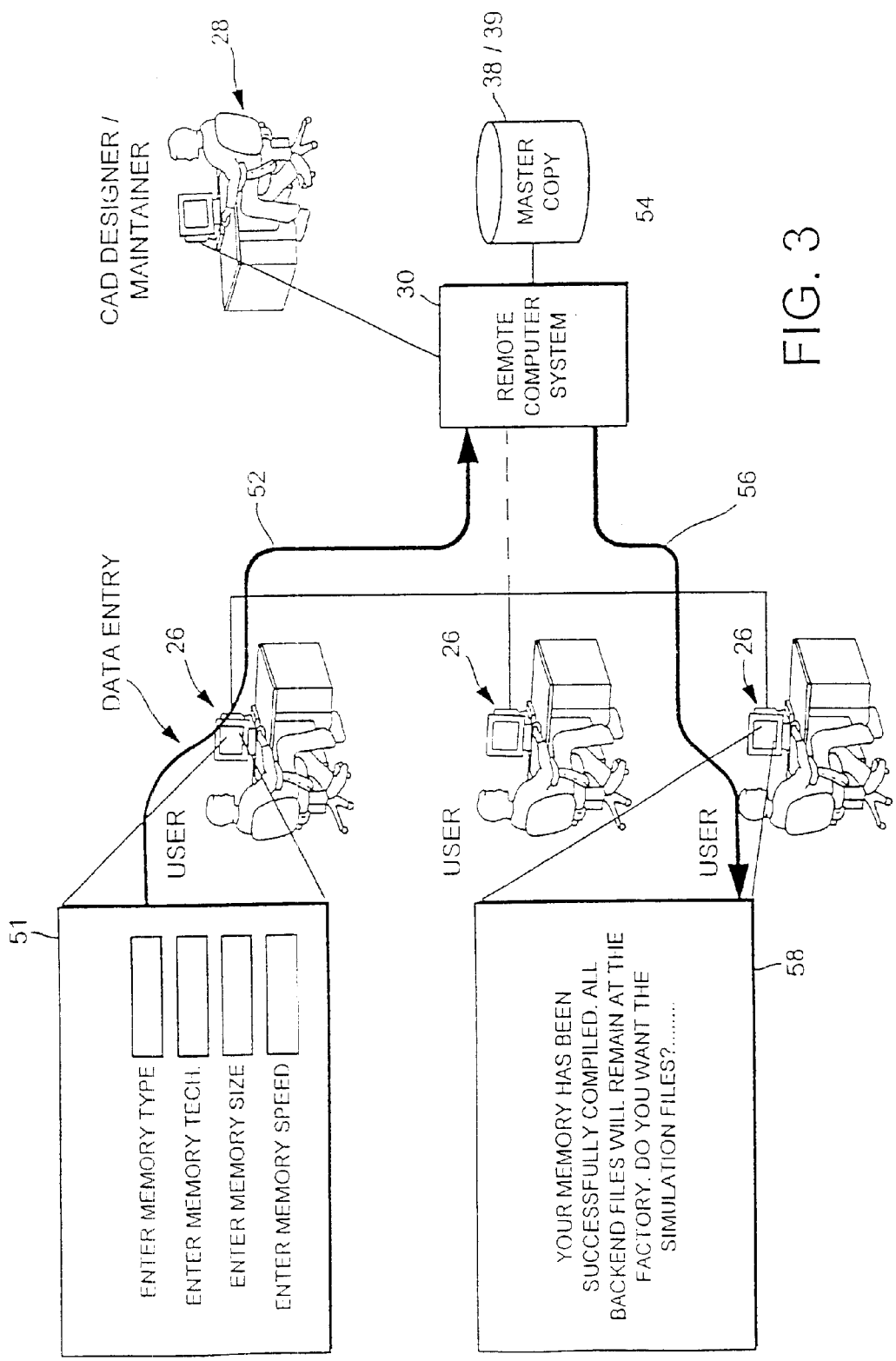
FIG. 3 is a further schematic representation of the system of FIG. 2 for illustrating the flow of information.

FIG. 3 is a schematic representation of the use of the system as shown in FIG. 2. In the preferred embodiment, the system operates by running CAD programs on the server station with the user gaining access to those programs from his/her client station over the world wide web (intranet and/or internet). Access is achieved through the use of "forms" for defining parameters of a CAD task to be performed.

The user interacts with a standard WEB page that captures his design requirements, for example by use of a software form 51. The form can be generated locally at the client station, but preferably this is received from the server station when the user accesses a web page at that server station. Accordingly, this provides the advantage that the server station can keep the forms up-to-date, and the user receives the latest version of the form when he/she wishes to make use of CAD tool functions.

Once the user has received and completed the form, he/she then submits (52) the form by effectively sending the contents of the fields he/she has just entered over the inter- or intranet to the CAD server, which is at a location remote from the user's location. The CAD server then processes (54) the data received (e.g. performs some form of analysis, synthesis or simulation, as required by the task concerned) and then returns (56) the results to the user, either in the form of some textual or graphical information, or as a file representing a completed design, for example, a file containing parameters of a circuit design or circuit cell design for an integrated circuit. It will be appreciated that the user client station thus only needs sufficient power to support the web browser capability. However, the client station can also be provided with sufficient computing power for performing further CAD tasks. Thus, it is possible that the remote server station is used for performing specific tasks, for example for defining the parameters of part of an overall design, which the user then incorporates in the full design which is being performed at his/her client station.

Figure 4:
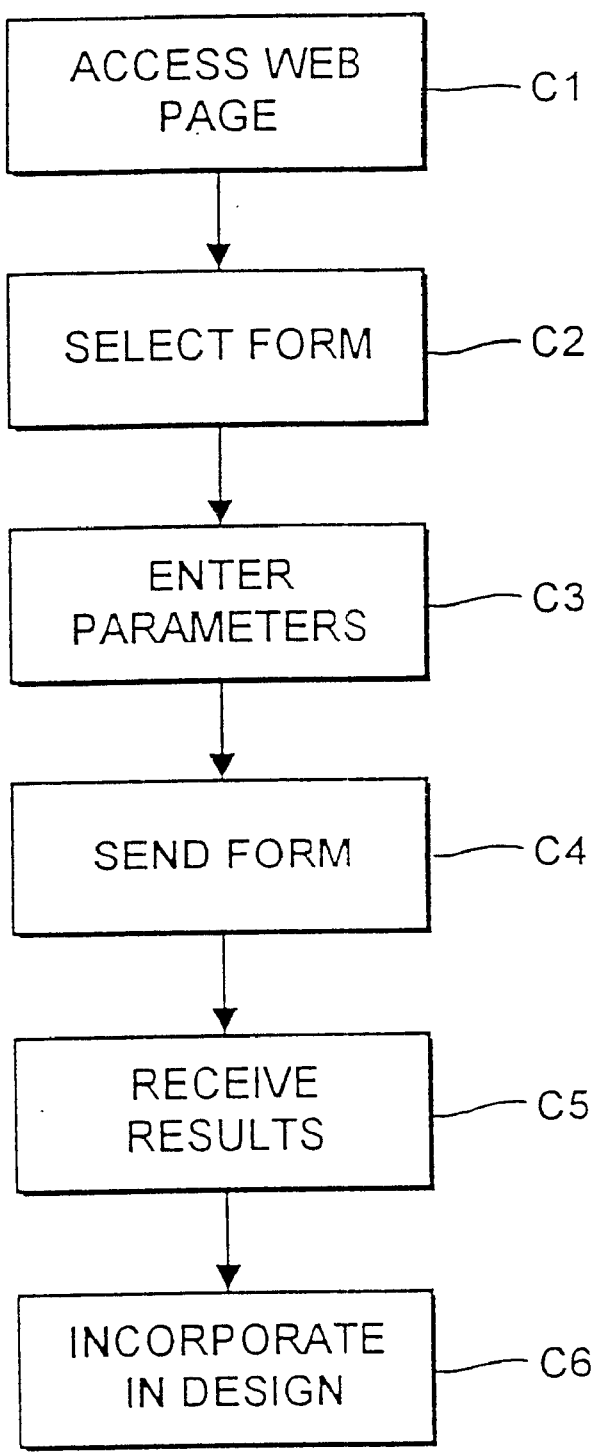
FIG. 4 is a flow diagram representing operations performed at a client station for the system of FIG. 2.

FIG. 4 is a flow diagram illustrating an example of the operations which might be performed by the user at a client station.

In Step C1, the user employs web browser software supported by the client station to access a web page supported by the server station. The process of accessing the web page can involve providing suitable security clearance (for example passwords) in order that only authorised users gain access.

In Step C2, the user can select an appropriate form for carrying out the CAD task required. For example, where the user is designing an integrated circuit, he/she might use a CAD tool with associated executable libraries which enable the designing of a memory or memory cell for incorporation into his/her integrated circuit design. Once again, at this stage, security can be provided (for example through the use of passwords) to ensure that only authorised users gain access to the forms.

The form is then downloaded by the server to the client station so that, in Step C3, the user is able to enter the various parameters of the design concerned. FIG. 5 is a schematic representation of a web form which might be supplied from the server station to the client station. It will be seen that various parameters of a memory cell are indicated, for example a cell name, compiler type, number of words, number of bits, column options, operating frequency, and so on. The form can be associated with appropriate prompt software, as will be apparent to one skilled in the art, to ensure that the user correctly completes the form.

Once the user has correctly completed the form., this can then be sent in Step C4 to the server station. Typically, this is performed by the form software selecting the parameters as entered by the user, and transmitting those parameters to the server station in a conventional manner.

All the user then has to do is wait until the server station has completed processing the tasks required, and returns the results in the form of textual, graphical, or parametric form, as appropriate, typically in the form of a computer file. Following receipt of the results in Step C5, the user can use those data in an appropriate manner, for example by incorporation into his/her local integrated circuit design in Step C6.

Figure 6:
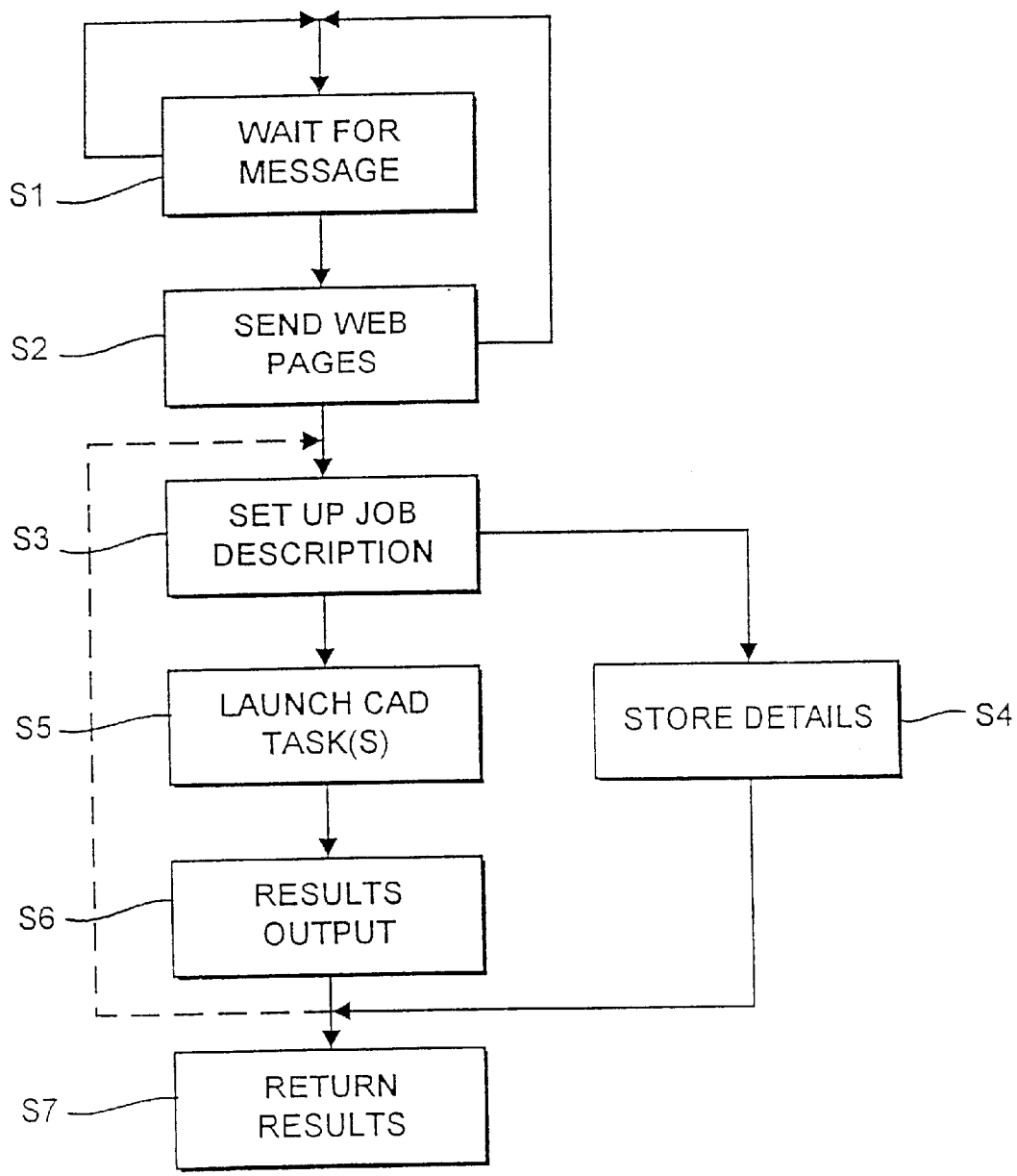
FIG. 6 is a flow diagram illustrating the operation of the server station of FIG. 2.

FIG. 6 is a flow diagram representing the functions performed by the server station.

In Step S1, the server station idles waiting for a message requesting access to the web page supported by the server station.

When access to the web page is requested, and subject to optional identification procedures, the web page can be supplied to the user in Step S2, including subsequently requested pages, for example a specific form associated with a CAD task.

When the parameters relating to a completed CAD task parameter form are received in Step S3, security checks are performed, as appropriate, and subject to correct authorization, the job description concerned is created and the details thereof are stored for later use in Step S4. The appropriate CAD task is launched in Step S5 and this process continues until the results are generated at Step S6.

In Step S7, the results are returned as a file to the user making use of the details for the job which were stored in Step S4.

The server station can also perform billing tasks, in a conventional manner, and can include the billing information with the returned data, or can process this separately as required.

Accordingly, a distributed CAD tool has been described whereby tasks such as synthesis, compilation, simulation and so on, which do not require "real-time" interaction with the tool are performed on a server station which is remote from a client station where a user is located. The server can be implemented by a powerful workstation, or by a mid-size or mainframe computer, as appropriate. The processing of CAD tasks can be performed in a batch process, or in a multi-processing environment, as desired, and as depending on a particular implementation of the server station. Rather than the simple process described above where a design tool performs a task and then immediately returns the results to the user, the results could be stored at the server for later transmission to the user. Alternatively, the results of the tasks performed by one CAD tool could form an input file for a further CAD tool, and so on. Using an embodiment of the invention, it will be possible to carry out a complete integrated circuit design with the user concerned, with the user merely requiring access to a workstation or other computer providing a web browser and a modem connection. Indeed, it is possible for the client station to be linked directly to a fabrication process for producing an integrated circuit according to said design.

Although a particular embodiment of the invention has been described, it will be appreciated that many modifications and/or additions may be made thereto without departing from the scope of the invention.

What is claimed:

1. A distributed computer aided design system comprising:

a server station including (i) a computer aided design tool for performing a plurality of computer aided design tasks and (ii) a communications interface; and one or more client stations remote from said server station and connectable to said server station via a communications medium, each of said client stations comprising (i) a display for displaying a parameter input form to a user, (ii) an input device for accepting a plurality of design parameters entered by said user and (iii) a communications interface for transmitting said design parameters via said communications medium to said server station;

wherein (a) said server station is configured to respond to a request communicated from said client stations to supply said parameter input form, (b) said computer aided design tool is configured to (i) receive said design parameters from said client station, (ii) perform at least one of said computer aided design tasks based on said design parameters and (iii) return a design task product to said client station via said communications medium and (c) said computer aided design tool comprises (i) a plurality of circuit design executables and (ii) a plurality of circuit design libraries, said circuit design executables being responsive to said design parameters to access said circuit design libraries automatically to perform a circuit design.

2. The system according to claim 1, wherein said communications medium is an intranet or internet medium.

3. The system according to claim 1, wherein each of said client stations further comprise a computer workstation having web browser capability.

4. The system according to claim 1, wherein said computer aided design tool further comprises:

a plurality of memory design executables; and a plurality of memory design libraries.

5. The system according to claim 1, wherein said computer aided design tool comprises a simulation tool.

6. A method of performing computer aided design comprising the steps of:

(A) supplying a parameter input form from a server station to a client station remotely located from said server station in response to a request from said client station;

(B) presenting said parameter input form to a user at said client station;

(C) transmitting a plurality of computer aided design parameters via a communications medium from said client station to a computer aided design tool of said server station, wherein said computer aided design tool comprises (i) a plurality of integrated circuit design executables and (ii) a plurality of circuit design libraries;

(D) automatically performing at least one of a plurality of computer aided design tasks in response to said design parameters;

(D1) accessing said circuit design libraries automatically with said integrated circuit design executables responsive to said design parameters to perform a circuit design; and (E) transmitting a design task product to said client station via said communications medium.

7. The method according to claim 6, wherein said communications medium is an intranet or internet medium.

8. The method according to claim 7, wherein Step (A) comprises the sub-steps of:

accessing said server station from said client station via said communications medium using a web browser; and receiving said parameter input form at said client station from said server station.

9. The method according to claim 6, wherein said computer aided design tool further comprises a plurality of memory design executables and a plurality of memory design libraries.

10. The method according to claim 6, wherein Step (D) comprises the sub-step of performing a design simulation task.

11. A method of conducting computer aided design, comprising the steps of:

(A) providing a distributed computer aided design system which includes a server station having (i) a computer aided design tool for performing a plurality of computer aided design tasks and (ii) a communications interface, wherein said computer aided design tool comprises (i) a plurality of circuit design executables and (ii) a plurality of circuit design libraries;

(B) providing a client station remote from said server station and connectable to said server station via a communications medium, said client station including (i) a display for displaying a parameter input form to a user, (ii) an input device for accepting a plurality of design parameters entered by said user, and (iii) a communications interface for transmitting said design parameters via said communications medium to said server station;

(C) configuring said server station to supply said parameter input form to said client station in response to a request from said client station;

(D) configuring said computer aided design tool to (i) receive said design parameters from said client station, (ii) perform at least one of said computer aided design tasks based on said design parameters, (iii) accesses said circuit design libraries automatically with said integrated circuit design executables responsive to said design parameters to perform a circuit design, and (iv) return a design task product to said client station via said communications medium; and (E) configuring said client station to (i) display said parameter input form to said user, (ii) transmit said design parameters via said communications medium to said server station, and (iii) receive said design task product via said communications medium from said server station.

12. The method according to claim 11, wherein said communications medium is an intranet or internet medium.

13. The method according to claim 12, wherein said client station comprises a computer workstation having web browser capability.

14. The method according to claim 11, wherein said computer aided design tool further comprises a plurality of memory design executables and a plurality of memory design libraries.

15. The method according to claim 11, wherein said computer aided design tool comprises a simulation tool.

* * * * *